United States Patent [19]

Vollmann

[11] Patent Number: 5,779,173
[45] Date of Patent: Jul. 14, 1998

[54] APPARATUS FOR OPERATING THE SHUTTER OF A CASSETTE

[75] Inventor: Norbert C. Vollmann, Eindhoven, Netherlands

[73] Assignee: U.S. Philips Corporation, New York, N.Y.

[21] Appl. No.: 751,376

[22] Filed: Nov. 19, 1996

Related U.S. Application Data

[63] Continuation of Ser. No. 401,759, Mar. 9, 1995, abandoned.

[30] Foreign Application Priority Data

Jun. 23, 1994 [EP] European Pat. Off. ............ 94201805

[51] Int. Cl.⁶ ..................... G11B 23/04; G11B 5/008; G11B 15/00
[52] U.S. Cl. ............. 242/338.4; 360/96.5; 360/96.6
[58] Field of Search ............. 242/338.4, 326.1, 242/338; 360/96.5, 99.06, 96.6

[56] References Cited

U.S. PATENT DOCUMENTS 5,231,553  7/1993  Weber et al. ............. 360/96.5

FOREIGN PATENT DOCUMENTS 0406943  1/1991  European Pat. Off.
0434143  6/1991  European Pat. Off.

Primary Examiner—John Q. Nguyen

[57] ABSTRACT

An apparatus (10) for playing DCC cassettes (1) has a holder (20) for positioning the cassette during cooperation with the apparatus. The holder (20) has an opening (21) through which the cassette (1) can be inserted into the holder in an orientation in which the label on a prerecorded DCC cassette is readable. An actuating mechanism (30; 40), which is movable between an initial situation and an end situation, is engageable with the shutter (4) to move the shutter into its open position in response to the insertion of the cassette (1) into the holder (20).

28 Claims, 6 Drawing Sheets

APPARATUS FOR OPERATING THE SHUTTER OF A CASSETTE

This is a continuation of application Ser. No. 08/401,759, filed Mar. 9, 1995, now abandoned.

BACKGROUND OF THE INVENTION

The invention relates to an apparatus for cooperation with an information carrier n a cassette, which cassette comprises a housing and a shutter having a closed position in which the information carrier is shielded and an open position in which the information carrier is accessible, which shutter can be brought from the closed position into the open position by moving it relative to the housing in a first direction of the cassette, which apparatus comprises a holder for positioning the cassette during cooperation with the apparatus, which holder has an opening at its top, through which the cassette can be inserted into a cassette compartment in the holder in a direction of insertion, which apparatus said comprises an actuating mechanism movable between an initial condition and an end condition and comprising an actuator which is engageable with the shutter to move the shutter into its open position.

Such an apparatus is known from EP 0,406,943 A1 to which U.S. Pat. No. 5,237,479 corresponds (herewith incorporated by reference). The known apparatus serves for reproducing signals from an information carrier, in the present case a magnetic tape of an Analog Compact Cassette (ACC) or a Digital Compact Cassette (DCC). In contradistinction to the ACC cassette the DCC cassette has a shutter which is urged into its closed position by a spring in the cassette. This shutter is slidable in a first direction towards its open position. Prerecorded DCC cassettes have a label which covers one side of the cassette almost completely. This label is always oriented to be viewed with the cassette held in a position in which its first direction points downwards.

The know n apparatus has a holder for positioning cassettes of both types during cooperation with the apparatus. For loading these cassettes the holder has an opening through which a cassette can be inserted into the holder in a direction of insertion perpendicular to said first direction. After insertion the holder is moved to an operational position in which drive spindles of the apparatus engage the reel hubs in the cassette. To permit this engagement in the case of the DCC cassette the shutter of the DCC cassette has to be opened before the holder is moved to its operational position. To this end, the known apparatus comprises an actuating mechanism which presses the shutter into its open position while the cassette is inserted into the holder. The actuating mechanism of the known apparatus comprises a member which at one end is pivotably connected to a pivot and at another end has an actuator portion adapted to cooperate with the shutter and the housing of the cassette. The position of the pivot and the position of the actuator portion in an initial situation have been so selected that the actuator portion slides past the housing and urges the shutter into its open position as the cassette is inserted into the holder, in such a manner that the shutter is in its open position in an end situation.

To prevent the cassette from falling out of the holder the opening has been provided in the upper side of the holder. In addition, the holder has such a shape that the DCC cassette must be inserted into the holder in a direction perpendicular to said first direction. A drawback of the known apparatus is that the orientation in which the cassette is inserted into the holder does not correspond to the orientation in which the label is to be viewed. As a result of this, the user is likely to be mistaken as to the orientation in which the cassette is to be inserted into the holder, which may result in damage to the cassette or apparatus. The holder of the known apparatus has a window through which the label of the cassette is visible. However, since the orientation of the cassette does not correspond to that in which the label is to be read the user cannot readily identify the cassette in the apparatus and, moreover, it detracts from the appearance of the apparatus.

SUMMARY OF THE INVENTION

It is an object of the invention to improve an apparatus of the type defined in the opening paragraph in such a manner that the cassette can be inserted into the holder in an orientation corresponding to the orientation in which the label on prerecorded DCC cassettes is to be read.

To this end the apparatus in accordance with the invention is characterised in that the holder and the opening are shaped in such a manner that the cassette can be inserted into the holder solely in a direction of insertion parallel to said first direction of the cassette, and the actuating mechanism comprises means which are responsive to the insertion of the cassette into the holder to move the actuator both relative to the cassette and relative to the holder in the direction of insertion. These steps allow the DCC cassette to be inserted into the holder in a logical orientation and the shutter is opened automatically by inserting the cassette into the holder. Moreover, it is achieved that if the holder has a window the user can readily identify the cassette in the apparatus. In addition, the cassette is prevented from falling out of the holder since the opening in the holder is situated at the top of the holder. An advantage of an entirely different nature is that the appearance of the apparatus in accordance with the invention can differ distinctly from that of existing apparatuses, so that it is easier to recognise.

An embodiment of the invention is characterised in that the actuating mechanism further comprises a driver which is separate from the actuator and which is adapted to cooperate with the cassette at a point of engagement in such a manner that during insertion of the cassette into the holder the point of engagement is moved in the direction of insertion, and a supported part by means of which the actuating mechanism is supported in the apparatus, and in that the actuating mechanism comprises a transmission mechanism of a such a type that a movement of the point of engagement results in a larger movement of the actuator in the same direction. With these steps it is achieved that the actuating mechanism is driven directly by the cassette. Thus, the cassette insertion movement is utilised directly to open the shutter, thereby enabling the drive spindles of the apparatus to engage directly with the reel hubs in the cassette.

An embodiment of the apparatus in accordance with invention is characterised in that the actuating mechanism comprises a lever having a free end connected to the actuator, which lever also includes the supported part and the driver, and in that the first distance between the supported part and said free end, measured perpendicularly to the direction of insertion, is larger than the second distance between the supported part and the point of engagement, measured perpendicularly to the direction of insertion. By means of these steps it is achieved that the actuating mechanism is of simple construction and can therefore be manufactured cheaply. Moreover, a lever readily allows a suitable transmission ratio to be realised.

An embodiment of the apparatus in accordance with invention is characterised in that the first distance is at least twice as large as the second distance. Preferably, the actuator is not made to cooperate with the shutter until the shutter part with which the actuator should engage is situated in the apparatus. In the case of, for example, DCC cassettes the cassette will then project only a little way from the apparatus, so that only a slight displacement of the cassette is required to complete insertion. The shutter is then opened during this small displacement. With the above step it is achieved that the actuator is moved over at least the same distance relative to the point of engagement as the point of engagement relative to the holder. As a result, the distance over which the cassette is to be inserted into the holder to move the shutter into its open position after the actuator has engaged the shutter is at least limited to the travel required to move the shutter from its closed to its open position. This limitation enables the overall height of the holder to be reduced, which provides greater freedom in designing the apparatus.

An embodiment of the apparatus in accordance with the invention is characterised in that in the initial situation a line interconnecting the supported part and the driver extends at an angle of between 60 and 90 degrees relative to the direction of insertion. This step ensures that the point of engagement is hardly moved relative to the cassette during cooperation with the cassette, which prevents insertion of the cassette from being impeded by friction at the location of the point of engagement.

An embodiment of the apparatus in accordance with the invention is characterised in that the ratio between the first distance and the second distance depends on the extent to which the cassette is inserted into the holder. It appears that an average user appreciates a specific variation of the force needed to insert the cassette into the holder. The above step enables the insertion force to be adapted to the desired characteristic.

An embodiment of the apparatus in accordance with the invention is characterised in that the transmission mechanism comprises a flexible traction element which can be loaded in tension and has a first end connected to the actuator, in that the supported part is formed by a second end of the traction element, and in that an intermediate part, situated between the first and the second end, cooperates with the driver. With this step it is achieved that the actuating mechanism can have small dimensions in a direction perpendicular to the direction of insertion, which provides greater freedom for the designer to meet other requirements, for example aesthetic requirements imposed on the appearance.

An embodiment of the apparatus in accordance with the invention is characterised in that the driver comprises one or more rollers over which the intermediate part of the traction element is passed. This step prevents insertion of the cassette from being impeded by friction between the driver and the traction element.

An embodiment of the apparatus in accordance with the invention is characterised in that the driver is guided by a guide means having a guide surface disposed at an angle relative to the direction of insertion, which guide means in the initial situation positions the actuator outside the cassette compartment and in the end situation positions the actuator inside the cassette compartment when the cassette compartment is accessible for the actuator. By means of this step it is achieved that the actuator is disposed outside the path of the cassette during insertion of the cassette. The actuator is not moved into the holder until the cassette has been inserted so far into the holder that the actuator can be made to engage the shutter. This has the advantage that the actuator does not form an obstruction during insertion of the cassette into the holder.

An embodiment of the apparatus in accordance with the invention is characterised in that at least a part of the guide surface consists of one or more resilient elements which deflect when the cassette compartment is inaccessible to the actuator. As a result, it is also possible to insert the aforementioned ACC cassettes into the holder. ACC cassettes do not comprise a shutter and have such a shape that they inhibit access of the actuator to the holder. By making the guide means depressible by means of resilient elements the actuating mechanism is not blocked when ACC cassettes are inserted.

The invention will now be described in more detail, by way of example, with reference to the drawings:

It is to be noted that the embodiments are shown diagrammatically and the Figures are shown to an arbitrary scale, which is not always the same.

DESCRIPTION OF THE PREFERRED EMBODIMENT

Figure 1:
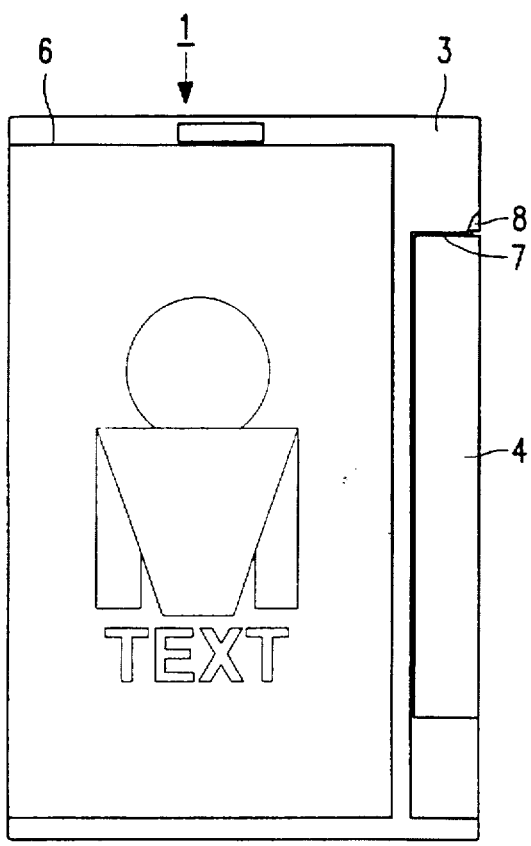
FIG. 1 is a front view showing a DCC cassette with a shutter in its closed position.

FIG. 1 shows a Digital Compact Cassette 1 (DCC). The DCC cassette 1 has a housing 3 and a shutter 4, which is urged into its closed position by a spring, not shown. The present DCC cassette, further has an information label 6.

Figure 2:
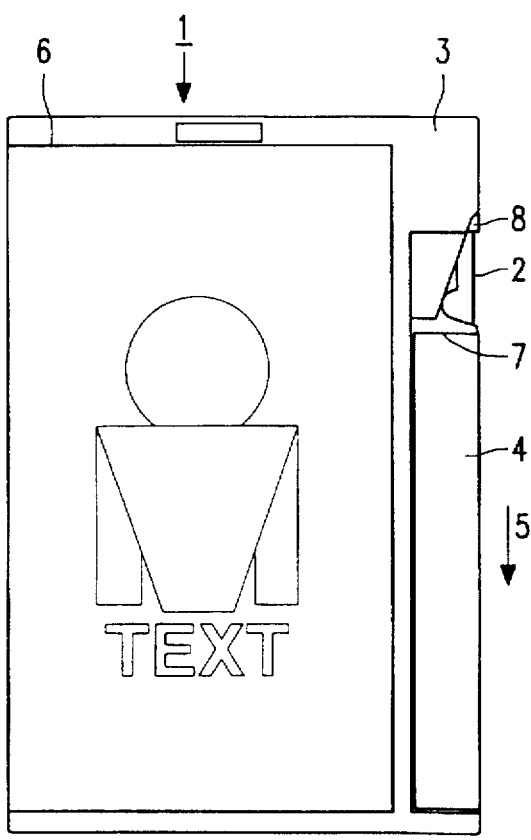
FIG. 2 is a front view showing a DCC cassette with the shutter in its open position.

FIG. 2 shows a DCC cassette with a shutter 4 in its open position. In the open position an information carrier, in the present case a magnetic tape 2, is accessible. The open position is reached by moving the shutter 4 out of its closed position in a first direction 5 relative to the housing 3 of the cassette.

Figure 3:
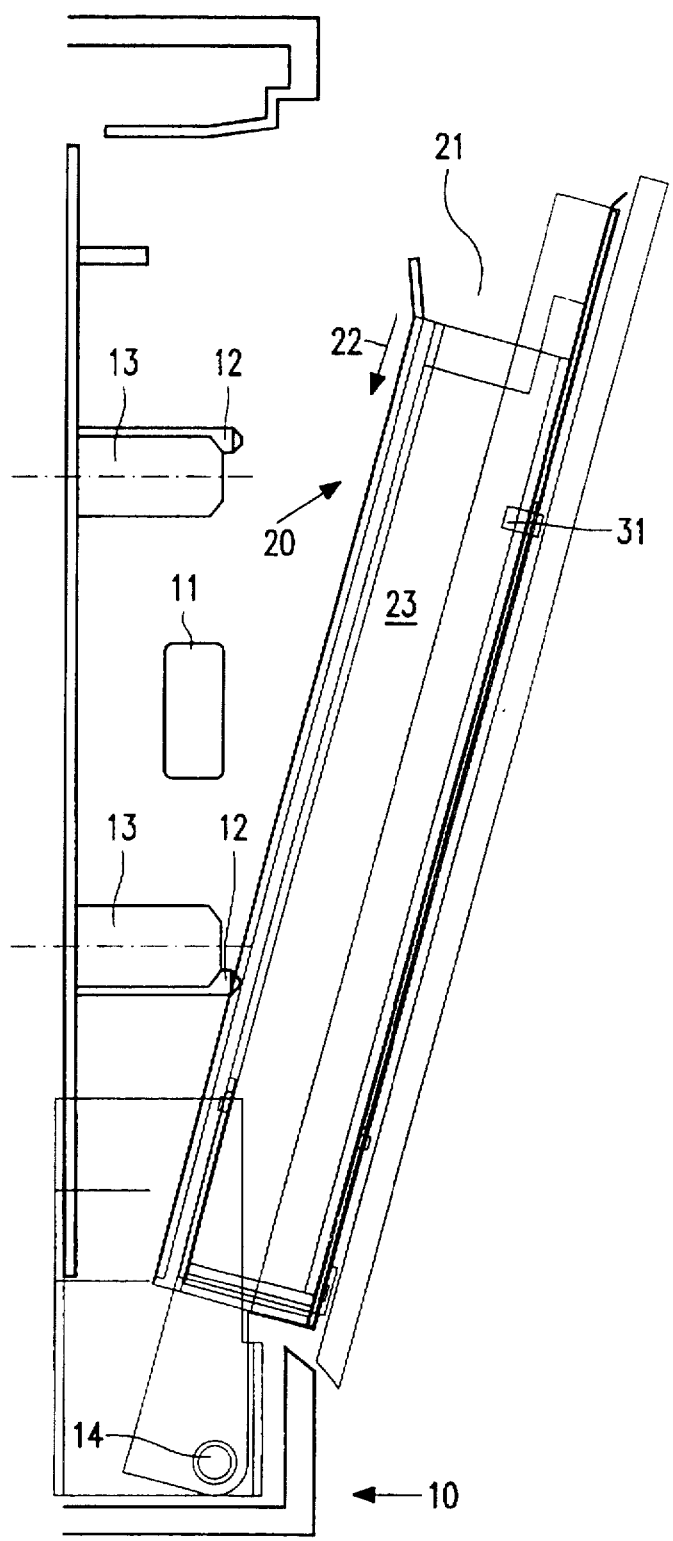
FIG. 3 is a side view showing a part of an apparatus in accordance with the invention with a holder for positioning the cassette.

FIG. 3 is a side view showing a part of an apparatus 10 and a holder 20 for cooperation with a cassette. The holder has an opening 21 at the top through which the cassette can be inserted into the holder in a direction of insertion 22. The apparatus 10 further comprises a head 11 for reading and/or writing information from/on the magnetic tape 2, capstans 12 for driving the magnetic tape 2, drive spindles 13 for driving reel hubs on which the magnetic tape 2 is wound, and a hinge 14 by which the holder 20 is connected to the apparatus. The holder 20 is movable between a loading position as shown in FIG. 3 and an operational position in which the apparatus can cooperate with the cassette 1.

Figure 4:
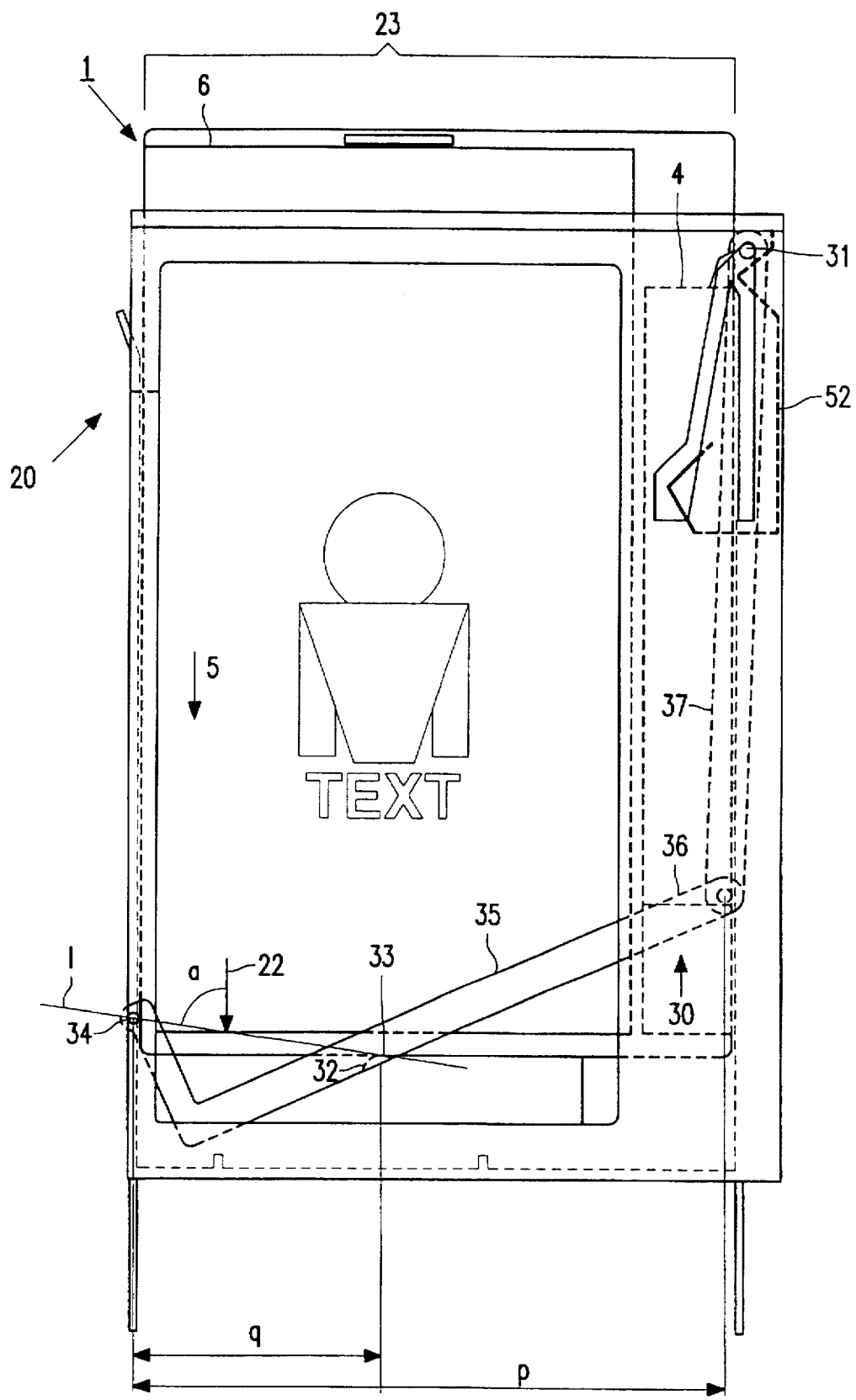
FIG. 4 is a front view showing the holder with an actuating mechanism of an apparatus in accordance with the invention in its initial situation.

FIG. 4 is a front view showing the holder 20 and an actuating mechanism 30 with the cassette 1 disposed partly in a cassette compartment 23 inside the holder 20. The actuating mechanism 30 comprises a lever 35 having a supported end 34, connected to the holder 20 by means of a pivot. The free end 36 is connected to a pin 31 via a plate member 37, which pin serves as the actuator of the actuating mechanism 30. The lever 35 has a projection 32, which projects into the cassette compartment 23 and which serves as the driver of the actuating mechanism 30. FIG. 4 shows the actuating mechanism 30 in its initial situation in which the cassette 1 rests on the projection 32 at the location of a point of engagement 33. A line 1 connecting the supported part, in the present case the part at the location of the pivot 34, and the projection 32 to one another extends at an angle α of between 60 and 90 degrees relative to the direction of insertion 22. As a result of this, the point of engagement 33 is hardly moved relative to the cassette 1 during cooperation with the cassette, which reduces friction and thereby reduces the force required to insert the cassette.

The cassette 1 is placed in the holder 20 in such a way that the first direction 5 of the cassette and the direction of insertion 22 correspond, as a result of which the label 67 has the correct orientation in order to be read.

Figure 5:
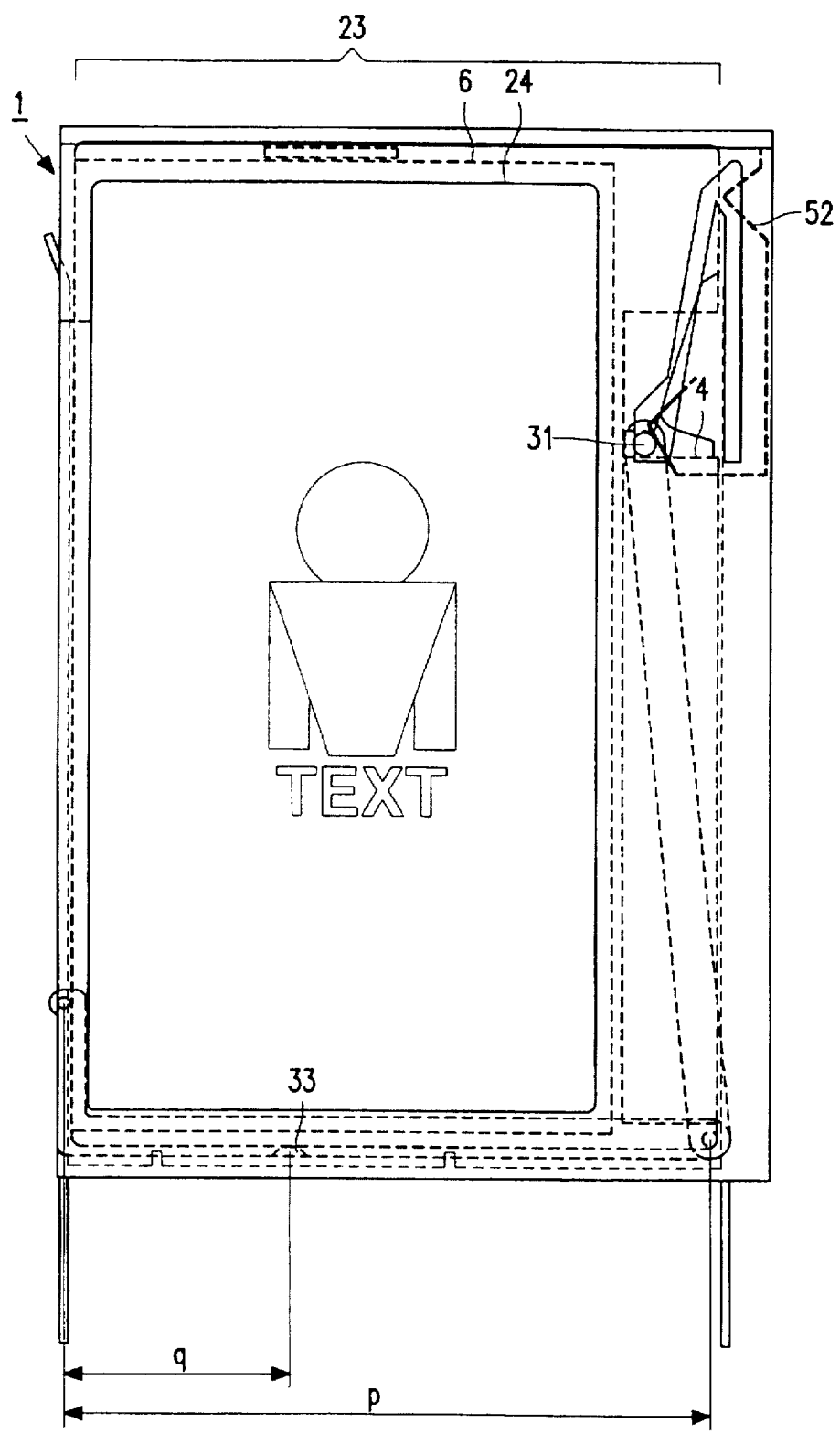
FIG. 5 is a front view showing the holder with an actuating mechanism of an apparatus in accordance with the invention in its end situation.

FIG. 5 is a front view showing the holder 20 and the actuating mechanism 30 when the cassette 1 is disposed completely in the cassette compartment 23 inside the holder. The label 6 is visible through a window 24 and owing to the correct orientation it can be read while the cassette 1 is inside the holder 20. As a result, the user can identify the cassette in the apparatus. The actuating mechanism 30 is now in an end situation, in which the pin 31 engages with a side wall of the shutter 4 and occupies such a position relative to the cassette 1 that the shutter 4 is in its open position. During insertion of the cassette 1 into the holder 20 the point of engagement 33 has moved in the direction of insertion 22. The lever 35 transforms this movement into a larger movement of the pin 31 in the same direction in that the distance p between the pivot 34 and the free end 36 of the lever 35 is larger than the distance q between the pivot and the point of engagement 33. In the present case the distance p is even more than twice as large as the distance q. As a result, the movement of the pin 31 relative to the housing 3 of the cassette 1 is larger than the movement of the cassette which causes the first-mentioned movement. As a consequence, the movement of the cassette 1 after engagement of the pin 31 with the side wall of the shutter 4 can be smaller than the movement of the shutter relative to the cassette in order to bring the shutter from its closed into its open position. The side wall of the shutter, which is suitable as a point of engagement for opening the shutter, does not enter the holder until a small part of the cassette projects from the holder. The fact that a small movement of the cassette 1 is adequate to complete insertion is advantageous because this enables the overall height of the holder to be limited, which provides greater freedom as regards the design of the apparatus.

Figure 6:
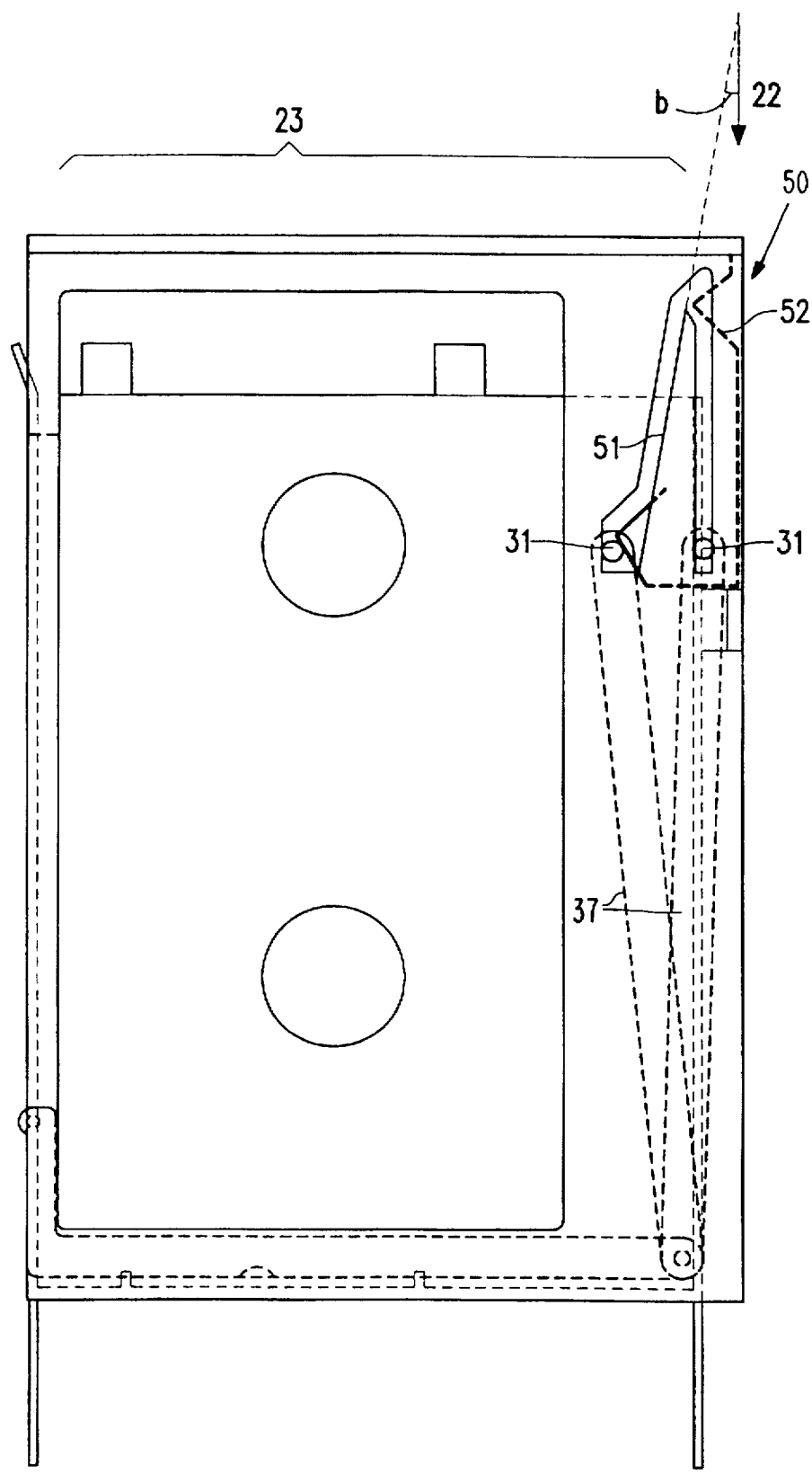
FIG. 6 is a front view showing the holder with an actuating mechanism of an apparatus in accordance with the invention in its end situation when the holder is inaccessible to the actuator.

FIG. 6 is a front view of the holder 20 with the actuating mechanism 30 in its end situation. The cassette is not shown for the sake of clarity. During the movement between the initial situation and the end situation the pin 31 is guided by a guide means 50 having a guide surface formed by a part of the spring 52 and the wall 51 disposed at an angle b relative to the direction of insertion 22. The guide surface 51, 52 extends partly over the cassette compartment 23 and partly adjacent this compartment. In the initial situation this guide means 50 positions the pin 31 outside the cassette compartment 23. When the pin 31 is moved in the direction of insertion it is urged into the cassette compartment 23 by a resilient element, in the present case a spring 52, at the instant at which the opening 8 in the housing 3 of the DCC cassette 1 is situated at the location of the pin 31 (see FIG. 1). This enables the pin 31 to engage with a side wall 7 of the shutter 4 (see FIG. 1). Since the pin 31 moves in the direction of insertion 22 relative to the cassette, the shutter 4 is driven by the pin 31 until the actuating mechanism 30 has reached its end situation and the shutter 4 is in its open position. If an ACC cassette is inserted into the holder 20, the cassette compartment 23 will not be accessible for the pin 31 because the ACC cassette does not have an opening like the DCC cassette 1. As a result, the spring 52 will deflect and the pin 31 will be outside the cassette compartment 23 in the end situation.

Figure 7:
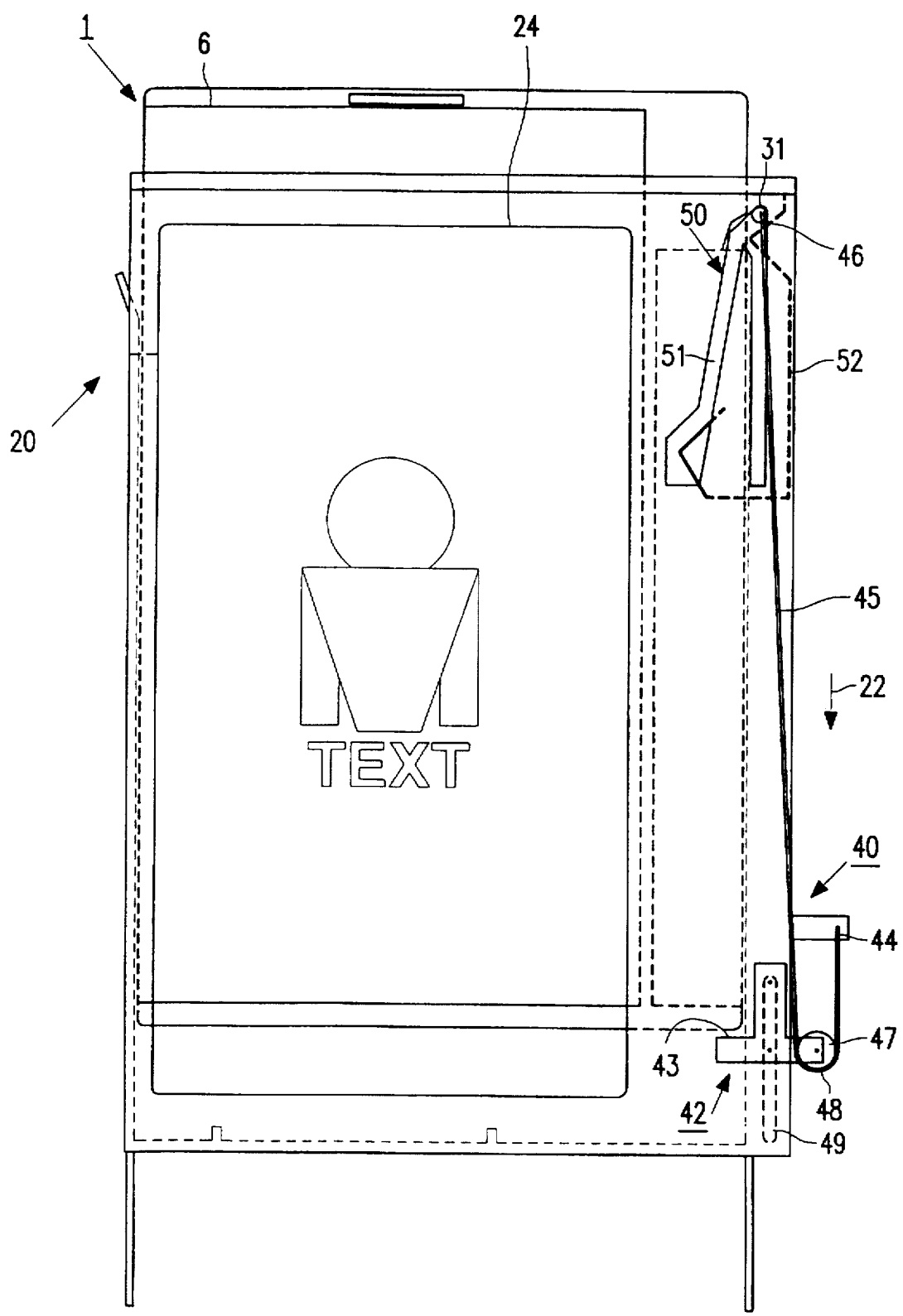
FIG. 7 is a front view showing the holder with an actuating mechanism in another embodiment of an apparatus in accordance with the invention in its end situation.

FIG. 7 is a front view showing the holder 20 with a actuating mechanism 40 in another embodiment. The actuating mechanism 40 is in the initial situation while the cassette 1 extends partly into the cassette compartment 23 inside the holder 20. The actuating mechanism comprises a traction element, in the present case a cable 45, having a first end 46 connected to a pin 31, which serves as the actuator of the actuating mechanism 40 and is mounted in the guide means 50. A second end 44 of the cable 45 is secured to a fixed point in the apparatus, in the present case to the holder 20. FIG. 7 further shows that at the location of a point of engagement 43 the cassette 1 rests on a slide 42 mounted in a slot 49 in the holder 20 and serving as the driver. The slide 42 carries a roller 47 over which an intermediate part of the cable 45, situated between the ends, is passed. If the cassette 1 is now farther inserted into the holder 20 the driver 42 will be subjected to the same movement as the cassette 1. As a result, the pin 31 will also be moved in the direction of insertion via the roller 47 and the cable 45 but over a distance twice as large as that over which the cassette 1 is moved. In a similar way as in the first embodiment the pin 31 is then guided by the guide means 50, so that in the end situation the shutter of a DCC cassette 1 is in its open position. The advantage of the actuating mechanism 40 just described is that it can be used in such a manner that it is not visible through the window 24, which is favourable for the appearance of the apparatus.

From the above description it will be apparent that, even in the case of a direction of insertion corresponding to the direction in which the shutter is moved from its closed to its open position, the actuating mechanism can be realised by means of a limited number of parts.

I claim:

1. An apparatus for cooperation with a cassette, the cassette having an information carrier, a housing and a shutter, the shutter being movable relative to the housing in an opening direction from a closed position in which the information carrier is shielded to an open position in which the information carrier is accessible, the apparatus comprising:

a holder into which the cassette is removably insertable in an insertion direction, the insertion direction corresponding substantially to the opening direction of the shutter;

an actuator capable of engaging the shutter of the cassette;

an actuating mechanism, coupled to the actuator, for driving movement of the actuator;

control means, coupled to the actuator, for causing the actuator to engage the shutter and for directing movement of the actuator, as driven by the actuating mechanism, so that said movement relative to said housing and said cassette is substantially in the insertion direction, thereby moving the shutter in the opening direction toward the open position.

2. The apparatus of claim 1, wherein the actuating mechanism comprises a leveraging translation mechanism, the leveraging translation mechanism engaging the cassette as the cassette moves into the holder to drive movement of the actuator along the insertion direction at a rate greater than the rate of movement of the cassette.

3. The apparatus of claim 2, wherein the translation mechanism comprises a lever.

4. The apparatus of claim 3, wherein the lever has a first end and a second end, the first end being pivotably mounted to the holder and the second end being coupled to the actuator.

5. The apparatus of claim 2, wherein the translation mechanism comprises a roller, one end of which is coupled to the actuator.

6. The apparatus of claim 2, further comprising a linking mechanism for coupling the actuator and the actuating mechanism.

7. The apparatus of claim 6, wherein the linking mechanism comprises an extension member having a first end and a second end, and the translation mechanism comprises a lever having a first end and a second end, the first end of the extension member being connected to the actuator and the second end of the extension member being connected to second end of the lever, and the first end of the lever being pivotably mounted to the holder.

8. The apparatus of claim 7, wherein the actuating mechanism includes a driver and an engagement element, the driver comprising a projection, the projection being disposed on the lever at a selected distance between the first and second ends of the lever and being capable of reciprocal movement in the direction of insertion, and the engagement element comprising at least a point on the surface of the projection for engaging the cassette.

9. The apparatus of claim 8, wherein the projection is disposed so that the distance between the first and second ends of the lever (p) is at least twice the distance from the projection to the first end of the lever (q), both distances measured perpendicularly to the direction of insertion.

10. The apparatus of claim 8, wherein, upon initial engagement of the actuating mechanism and the cassette, the first end of the lever and the engagement element describe a line, the line forming an angle with the direction of insertion, the angle being substantially in the range of 60 to 90 degrees.

11. The apparatus of claim 6, further comprising a fixed point, wherein the linking mechanism comprises a flexible traction element having a first end, a second end and an intermediate part between the first and second ends, and the translation mechanism comprises a roller, the first end of the flexible traction element being connected to the actuator and the second end of the flexible traction element being connected to the fixed point, the intermediate part of the flexible traction element passing around the roller.

12. The apparatus of claim 11, wherein the actuating mechanism includes an engagement element and a driver, the driver comprising a slide carrying the roller and having reciprocatable movement in the direction or insertion, and the engagement element comprising at least a point on the slide, the engagement element providing for the actuating mechanism to engage the cassette so as to be responsive to the insertion thereof in the holder, and the driver coupling the engagement element and the linking mechanism.

13. The apparatus of claim 6, wherein the actuating mechanism comprises an engagement element and a driver.

14. The apparatus of claim 1, further comprising a linking mechanism for coupling the actuator and the actuating mechanism.

15. The apparatus of claim 14, wherein the actuating mechanism comprises an engagement element and a driver.

16. The apparatus of claim 1, wherein the control means is responsive to the insertion of the cassette.

17. The apparatus of claim 1, wherein the holder comprises a cassette compartment for receiving the cassette when removably inserted into the apparatus, and wherein the control means comprises a guide surface formed by a wall element and a resilient element, the guide surface extending into the cassette compartment.

18. The apparatus of claim 17, wherein a portion of the guide surface extending into the cassette compartment is disposed at a selected angle relative to the direction of insertion.

19. The apparatus of claim 17, wherein the actuator comprises a pin.

20. The apparatus of claim 17, wherein the guide surface extends into an area adjacent the cassette compartment.

21. The apparatus of claim 20, wherein the resilient element, upon insertion of the cassette having the shutter into the holder, provides sufficient resistance to said actuator for the actuator to be directed along the guide surface into the cassette compartment and, upon insertion of a shutterless cassette into the holder, deflects to along the guide surface in the area adjacent the cassette compartment.

22. An apparatus for cooperation with a cassette, the cassette having an information carrier, a housing and a shutter, the shutter being movable relative to the housing in an opening direction from a closed position in which the information carrier is shielded to an open position in which the information carrier is accessible, the apparatus comprising:

a holder into which the cassette is removably insertable in an insertion direction, the insertion direction corresponding substantially to the opening direction of the shutter;

an actuator capable of engaging the shutter of the cassette so as to move the shutter to the open position;

an actuating mechanism, coupled to the actuator, for driving movement of the actuator;

control means, coupled to the actuator, for causing the actuator to engage the shutter and for directing movement of the actuator, as driven by the actuating mechanism, so that said movement relative to said housing and said cassette is substantially in the insertion direction, thereby moving the shutter in the opening direction toward the open position;

wherein the actuating mechanism comprises a leveraging translation mechanism, the leveraging translation mechanism engaging the cassette as the cassette moves into the holder to drive movement of the actuator along the insertion direction at a rate greater than the rate of movement of the cassette;

further comprising a linking mechanism for coupling the actuator and the actuating mechanism, the linking mechanism comprising an extension member having a first end and a second end, and the translation mechanism comprises a lever having a first end and a second end, the first end of the extension member being connected to the actuator and the second end of the extension member being connected to the second end of the lever, and the first end of the lever being pivotably mounted to the holder;

wherein the actuating mechanism includes a driver and an engagement element, the driver comprising a projection, the projection being disposed on the lever at a selected distance between the first and second ends of the lever and being capable of reciprocal movement in the direction of insertion, and the engagement element comprising at least a point on the surface of the projection for engaging the cassette.

23. The apparatus of claim 22, wherein the projection is disposed so that the distance between the first and second ends of the lever (p) is at least twice the distance from the projection to the first end of the lever (q), both distances measured perpendicularly to the direction of insertion.

24. The apparatus of claim 22, wherein, upon initial engagement of the actuating mechanism and the cassette, the first end of the lever and the engagement element describe a line, the line forming an angle with the direction of insertion, the angle being substantially in the range of 60 to 90 degrees.

25. An apparatus for cooperation with a cassette, the cassette having an information carrier, a housing and a shutter, the shutter being movable relative to the housing in an opening direction from a closed position in which the information carrier is shielded to an open position in which the information carrier is accessible, the apparatus comprising:

a holder into which the cassette is removably insertable in an insertion direction, the insertion direction corresponding substantially to the opening direction of the shutter;

an actuator capable of engaging the shutter of the cassette and of moving along the insertion direction;

a leveraging translation mechanism coupled to the actuator, the leveraging translation mechanism engaging the cassette as the cassette moves into the holder so as to drive movement of the actuator over a distance along the insertion direction at a rate greater than the rate of movement of the cassette.

26. The apparatus of claim 25, further comprising a linking mechanism for coupling the actuator and the translation mechanism.

27. The apparatus of claims 26, wherein the translation mechanism comprises an engagement element and a driver.

28. The apparatus of claim 25, further comprising a control mechanism which controls the actuator responsive to whether the holder has inserted thereinto either the cassette having the shutter or a shutterless cassette, wherein:

responsive to insertion into the holder of the cassette having the shutter, the control mechanism causes the actuator to engage the shutter and directs movement of the actuator, as driven by the translation mechanism, in a direction having a component along the insertion direction, thereby moving the shutter in the opening direction toward the open position, and responsive to insertion of a shutterless cassette, the control mechanism directs the actuator to an area adjacent the shutterless cassette so as not to engage the shutterless cassette.

* * * * *